United States Patent Office 2,871,134
Patented Jan. 27, 1959

2,871,134

GYPSUM PRODUCTS AND PROCESS OF MANUFACTURE

Clarence J. Loechl, Arlington Heights, Ill., assignor to The Celotex Corporation, Chicago, Ill., a corporation of Delaware No Drawing. Application November 22, 1954
Serial No. 470,521

13 Claims. (Cl. 106—110)

This invention is with reference to various gypsum building products, by way of example, gypsum, wallboard, plaster and the like, and various types of cast and molded gypsum products. Particularly there is involved the process of manufacture of what might be termed the basic mix or composition used in producing such products.

This invention relates not only to what might be termed ordinary products of the various classes referred to, but it also extends to and comprehends like products, however, in the preparation thereof so modified as to produce such products of fire resistant classification.

Heretofore it has been variously proposed that inorganic fibers such as asbestos fiber, glass fiber, mineral wool and the like be incorporated in gypsum products; in some cases as fiber distributed throughout the products and in other cases as bonded reinforcing strands or the like incorporated in such products.

The basis of or fundamental of the invention hereof is the preparation or provision of an admixture of calcined gypsum, in the industry generally referred to as stucco, with inorganic fiber, particularly mineral wool fiber, and wherein the mineral wool fiber content is dispersed throughout the stucco as substantially individualized fibers.

The admixture, stucco with substantially individualized mineral wool fiber distributed therethrough, then becomes the basis, by various manipulations and with various additions, for the production of the various products referred to—gypsum wallboard, plaster, molded products and the like.

The principal object of the invention hereof is the provision of a mixture of calcined gypsum and mineral wool fibers, wherein the mineral wool fibers are distributed throughout the gypsum material as substantially individualized fiber. A further object of the invention is the provision of a process for accomplishing the immediately foregoing objective. Other and further objects of the invention hereof are the production of products, such as above referred to, produced by suitable manipulative steps and procedures and involving various additions, all as will hereinafter be more fully described.

In the past there have been made various suggestions with respect to the use of glass fiber, glass wool, asbestos fiber and like inorganic fiber in hydraulic cement mixtures or calcined gypsum mixtures for reinforcing or strengthening purposes. Such prior suggestions, however, along such line have apparently been largely but merely objective expressions and such have been found to be unworkable in a commercial sense in the production of products such as above referred to. Such fibers, glass wool and mineral wool, are relatively short fibers produced by blowing molten glass, rock, slag and the like, and in the various processes for producing such products these fibers are formed in heterogeneous arrangement on screens as what might be termed thick blankets. In the past it has not been commercially practicable to utilize these fibers as reinforcing fibers in gypsum products, such as referred to above, for reinforcement. It has not been found possible to add the fibers of these fiber blankets to the gypsum stucco in such manner that the fibers are distributed throughout and substantially individualized in such gypsum stucco. Such fiber materials when added to a gypsum mix, instead of separating and distributing throughout, tend to ball up or form agglomerate masses, or, if subjected to severe mixing, to disintegrate substantially to powder.

So that there may be no misunderstanding concerning the invention hereof, attention is directed to Patent 2,681,863 Croce et al., wherein there is disclosed a method for incorporating textile glass fibers into gypsum wallboard and other products with which this invention deals. Textile glass fibers, however, are entirely different fibers compared to mineral and glass wools. These textile glass fibers are long drawn fibers such that chopped or cut sections thereof are short straight elements which can be mixed throughout a gypsum mix without a tendency to agglomerate or ball up. It is to be noted, however, that cut or chopped textile glass fiber comprises merely short sections of straight fiber, whereas, on the other hand, blown mineral or glass fibers as mineral or glass wool comprise masses of individual fibers which are not straight fibers and which when collected form into a loose and fluffy and more or less felted sheet or blanket form. Due to the different nature of the short chopped or cut textile glass elements as compared to those of mineral or glass wool, entirely different techniques are required for incorporating these respectively fibrous materials in a gypsum mix as substantially individual elements, and the techniques satisfactory for incorporating the chopped textile glass fibers will not work for the incorporation of mineral or glass wool fibers.

The fundamental of the invention hereof is the addition of mineral or glass wool to calcined gypsum or stucco as small tufts or agglomerates torn or separated from a blanket of such fibers and added to the dry stucco substantially individually and with approximate uniform addition, so that since these tufts of fibers are the minor portion of such composition they may be, with more or less approximation, uniformly distributed in the stucco.

For a clear understanding of the general procedure of the formation of mineral or glass wool by blowing with the collection of blown wool as a loose blanket, and for an illustration of a procedure for tearing tufts or agglomerates therefrom, as has above been referred to, reference is made to the patent to Coss, 2,375,284. This patent schematically shows a cupola or melting furnace, the jet or blast for blowing the molten material into fiber, and a wool room in which the fiber settles as a blanket on a conveyor running across the bottom of the wool room. This patent also shows what is termed a stationary rack and a rotatable paddle rack which might be termed complementing combs which serve, as the paddle rack or rotatable comb revolves, to tear small agglomerates or tufts of fibers from the blanket of fibers and deposit them on a conveyor. The disclosure of the patent, so far as it has been referred to, or equivalent thereof, can be utilized in the exercise of the invention hereof. The agglomerates or tufts of mineral or glass wool fibers would be thrown onto or deposited on a suitable conveyor carrying the gypsum stucco with which the fibers are to be admixed, and with proper proportioning of the respective speeds of the wool agglomerate feeding device and of the stucco conveyor, it is obvious that the wool agglomerates can be added to the stucco with reasonable uniformity and in the proportions in which they are to be admixed.

As the agglomerates or tufts of mineral wool have been proportionately added to the gypsum stucco, then with slight agitation or mixing it is obvious that these tufts or agglomerates of wool will be permeated with the finely divided or powdered stucco, with the result that the fibers are substantially individualized although still present as tufts or agglomerates. This admixture of permeated mineral wool tufts and stucco can now be utilized in the preparation of slurry mixtures for producing various products, and can be mixed together with water and other minor ingredients in the customary or usual mixer without causing balling or agglomerating of the fiber masses in the mixed slurry.

Apparently, due to the fact that the fibers in the dry agglomerates or tufts of fibers are separated and individualized by the dry stucco material, it results that when water is added together with other minor ingredients, as may be desired, that on subjecting such admixture to the customary mixing operation the individualized fibers do not tend to agglomerate but readily separate from the tufts or agglomerates of the form in which they were added, and distribute themselves as substantially individualized fibers, relatively uniformly distributed throughout the slurry formed by the mixing operation.

This admixture of stucco and stucco permeated agglomerates or tufts of mineral wool fibers, can as such, be the starting point for the preparation of various products therefrom, such as various plasters, wallboards, and so on, or it may be agitated or mixed to distribute and individualize the mineral wool fibers as separate fibers substantially uniformly distributed in the stucco mass and such may be the starting material for preparing the final products.

Various plasters can be prepared according to common practice and well known procedures, that is, sand may be added and mixed with the stucco and fiber materials, or various lightweight aggregates may be admixed, as, for example, expanded perlite, expanded vermiculite, and the like, and of course a suitable retarder and/or accelerator and other minor ingredients may be added, as is well known in the art involved.

For the manufacture of gypsum wallboard the stucco and stucco impregnated mineral wool fiber aggregates in admixture may be, with the addition of water and other commonly used ingredients, suitably mixed to a slurry and formed as a gypsum wallboard core between the usual face or cover sheets. Various of the procedures just referred to involve common and well known practices in the art, and for a further description of such procedures reference is made to Croce et al., 2,681,863, Croce 2,526,066 and Roos 2,080,009, as examples thereof. The various procedures of mixing which are involved in the preparation of the stucco slurry for gypsum wallboard will accomplish the desired separation of the individualized fibers of the tufts which had been incorporated in the dry stucco, and will result in distributing the individual fibers throughout the slurry mass as substantially individualized fibers which, as heretofore pointed out, has not been commercially practicable due to the balling up or so-called agglomeration of the mineral wool fibers added in accordance with the procedures which have heretofore been attempted.

Since the manufacture of various gypsum plasters, gypsum wallboard and the like are generally well known to those skilled in the industry involved, it is deemed that no detailed explanation is required for a complete disclosure, particularly in view of the various references which have been made to prior patents containing pertinent disclosures. It is to be understood, of course, that in making light weight casts or in the manufacture of gypsum wallboard utilizing the inventions hereof, that for the purposes of obtaining light weight the various lightener practices may be followed, that is, that of incorporating preformed foam or incorporating foaming agents which form bubbles during the mixing procedure, or through the addition of various light weight natural or expanded materials. It is also to be understood, of course, that while in many instances reference has merely been made to the utilization and incorporation of mineral wool, such is used, as has been heretofore indicated, with the intent that such covers or includes the various glass wools and other blown or equivalently produced fiberized molten mineral materials, as, for example, various slag wools, rock wool, which is produced from a rock comprised largely of calcium carbonate, and other wools produced from various rocks or similarly prepared compositions which are capable of being melted by the usual procedures and of being blown or fiberized as by equivalent procedures involving centrifugal projection and/or the like, and whereby the molten material is converted to and collected in more or less a loose blanket form as a more or less intertwined or lightly felted mass of short fibers.

Such masses of short fibers just referred to are particularly to be differentiated from the so-called chopped textile glass fibers which, as such, comprise short, straight sections of finely fibrous material produced as long textile strands by a drawing procedure drawing such strands from a molten glass furnace. The such chopped glass fibers being slender, short, straight and smooth, can be, without any difficulty, dispersed throughout dry stucco because of their physical characteristics, and in this respect are, of course, entirely different in their requirements for dispersion as compared to the short, agglomerated or intertwined fibers of the blankets which are formed in the usual production of blown mineral wool fibers.

While the foregoing disclosure has dealt substantially entirely with the individualizing of whole blown or equivalent mineral wool fibers in a gypsum stucco, it is to be understood that like procedures may be utilized to individualize and distribute the same type fibers in substantially any finely divided, pulverized or powdery material, as, for example, in a magnesium cement, Portland cement, or any of the similar cementitious materials, for the purpose of strengthening casts thereof and providing other improved characteristics of set products incorporating such ingredients and produced therefrom.

The variation of the procedure for incorporating the mineral wool fibers as individualized fibers distributed throughout the mass as heretofore described and which, under some circumstances, may be a preferred procedure for incorporating such fibers, is as follows:

Instead of adding small clumps of the mineral wool fiber to the dry gypsum stucco or calcined gypsum and then causing such dry, powdery material to permeate such tufts to individualize the fibers, such tufts of mineral fibers may be added to the raw or uncalcined gypsum. For calcining, the gypsum rock is ground to a relatively fine state of subdivision and then heated in kettles with some agitation to drive off one and one-half of the two molecules of water of the original form of the rock, as calcium sulfate dehydrate, to result in a calcium hemihydrate which is the calcined gypsum or stucco which is used for the manufacture of wallboards, plasters, or the like.

When the raw ground gypsum is calcined it is ordinarily calcined in large kettles which are provided with slow speed stirrers to cause some agitation and movement of the material in the kettles. Additionally, when the mass in the kettle reaches the calcining temperature and the water is being driven off as steam, such causes the mass to boil or roil, which causes additional agitation. These agitations will cause the dry powdered rock to penetrate the tufts of mineral fibers and isolate them and further cause separation or individualization of the fibers of the small clumps of mineral wool which were added and will cause their distribution relatively uniformly through the mass. Such mass, when the calcination is completed, that is, when the associated water has been reduced to one-half molecule, is discharged from the kettle and allowed to cool and is the calcined gypsum or stucco of commerce and manufacture.

This calcined gypsum to which the mineral wool has been added as tufts, individualized, and then distributed throughout the mass will constitute a calcined gypsum with the mineral wool fibers substantially individualized and relatively uniformly distributed throughout the mass of the material. Approximately the same amount of mineral wool is preferably added, as previously referred to, for addition to the stucco for the manufacture of gypsum wallboards, preferably 1%. Commercially within the approximate limits of one-half to two percent, although depending largely upon the economics in any particular case, the content of incorporated mineral wool fiber may run to as high as five percent, such and all the percentages mentioned being by weight based on the weight of the stucco.

Such calcined gypsum or stucco having the mineral wool fiber distributed therein as substantially individualized fibers may then be used as the stucco for the manufacture of gypsum wallboard, or for the preparation of various plasters, as is well known in the industry to which the inventions hereof relate.

As a specific improvement of the invention hereof, as it has so far been described, the disclosed procedures of incorporating mineral wool fiber in gypsum stucco, with a further addition of Wollastonite, as will be described in detail, may be availed of for the production of what are generally termed "fireproofed" or "fire resistant" gypsum products. In a previous application, Serial No. 409,777, filed February 11, 1954, by the inventor hereof, there has been described a fire resistant wallboard incorporating chopped textile glass fibers and Wollastanite particles distributed therethrough.

The wollastonite is a mineral of commerce, a natural mineral, a meta silicate of which in particular there is a large deposit near Cody Siding, Rademacher Mining District, Kearn County, California, which is substantially pure, analyzing approximately 47% silicate ($SiO_2$) and 42% line (CaO) with a small amount of magnesium, alkali and iron. The mineral is crystalline in form, the crystals being monoclinic prisms which by suitable grinding result in a finely fibrous mass in which the length of the particles are of the order of 13 times the diameters, so that this mineral as used may be said to be a finely fibrous substance. As used for the purposes hereof, the wollastonite is preferably ground to between about 20 to 200 mesh and screened substantially in the proportions of 41% retained on 30 mesh, 35% on 50 mesh, 7% on 100 mesh, and the balance passing the 100 mesh. The exact screen analysis as given need not necessarily be observed, but such is given merely as illustrative of the general order of subdivision of the mineral as it is utilized in the invention hereof.

The wollastonite mineral incorporated in accordance with this invention should, however, be of the general order of the subdivision in accordance with the screen analysis as above set out.

A typical gypsum wallboard manufactured in accordance with the inventions hereof and for one-half inch thickness and weight of approximately 2100 pounds per thousand square feet will comprise:

|  | Pounds | Percent |
| --- | --- | --- |
| Paper liners or surfacing sheets | 150 | 7.2 |
| Hydrated Gypsum | 1,900 | 91.1 |
| Mineral Wool | 17 | 0.8 |
| Starch | 12 | 0.6 |
| Accelerator | 4 | 0.2 |

Of course, in connection with the immediately foregoing, it is to be understood that the mineral wool content is with reference to the substantially individualized mineral wool fibers distributed throughout the mass in accordance with the inventions hereof, which mineral wool fibers are preferably of average diameters within the range of approximately 0.0002 to 0.0020 inch but preferably in the range of about 0.0005 to 0.0010. In addition to the basic ingredients for the manufacture of wallboard, as above referred to, it will, of course, be understood that some manufacturers may include small amounts of other ingredients therein, as, for example, in some instances it may be required that a small amount of retarder be incorporated or, in other instances, for waterproofing there may be incorporated a small amount of a suitable asphalt and paraffin emulsion, or the like. Also for reducing weight there may be incorporated in the typical ingredients as set out an amount of preformed foam or so-called foaming agent which, in the mixing operation, forms small bubbles throughout the mixed slurry to result in numerous small voids distributed throughout the core of the gypsum board in which a so prepared core mix is used.

A typical fire resistant gypsum wall board manufactured in accordance with the inventions hereof will be of substantially the formulation as above set out, except that the amount of stucco will be reduced and wollastonite particles, as specifically referred to, will be substituted to the extent that the added wollastonite constitutes approximately 10% of the weight of the gypsum stucco. The amount of wollastonite added as just referred to is not an exact critical amount, and, of course, it is to be understood that a reasonable variation, say to about five percent either plus or minus will produce substantially the same results.

In the foregoing there has been set out and described the procedure for individualizing mineral wool fibers and distributing them as substantially individual fibers throughout a mass of gypsum stucco whereby in various products produced therefrom such products may have distributed throughout the set mass thereof such substantially individualized mineral wool fibers.

It has also been disclosed that such individualization of mineral wool fibers is accomplished by detaching small tufts or agglomerates of such fibers from a loose blanket in which formed mineral wool fibers are usually collected in the manufacture thereof, which small tufts of fibers are proportionately added to dry gypsum stucco and with slight agitation are caused to be permeated with such finely divided gypsum stucco and thus substantially individualized one from another. Such mass of gypsum stucco having distributed therethrough the small loose tufts are mineral wool fibers permeated with the powdery stucco to the extent that the fibers of the tufts are substantially individualized thereby and then mixed with water and other suitable ingredients results in breaking up the such mineral wool tufts to distribute the fibers as substantially individual fibers throughout the admixed mass and resultant set product formed therefrom.

The utilization of mineral wool fibers in gypsum products, as has been referred to herein, is of very considerable advantage in the manufacture of gypsum products since the mineral wool fibers enter into the mix as what might be termed "dry" fibers which do not carry excess water into the mix, which excess water, if incorporated, would of necessity have to be dried out of the product in its manufacture. This mineral wool fiber content, of course, has the added advantage that it is a non-combustible and that due to its fibrous nature reinforces the finished set gypsum product, and has the effect of toughening or, stated otherwise, of reducing the apparent brittleness or frangibility of the set gypsum.

Still further there has been described the fire resistant gypsum admixture and products resulting therefrom which, due to the inclusion of a content of wollastonite along with the substantially individualized mineral wool fibers distributed throughout the product, result in particular in a gypsum wallboard which, under standard tests, is much more resistant to the effect of fire than wallboards not incorporating such mineral wool fibers and wollastonite content.

Just what function the wollastonite fraction has in the fire resistant gypsum wallboards, as above described, is not understood, but the added fire resistance is a fact.

Ordinarily gypsum wallboard without such content of wollastonite when subjected to fire quickly calcines and shrinks, forming cracks which allow the fire to penetrate the material. On the other hand, for a reason unexplained, as above referred to, gypsum wallboard incorporating the mineral wool and wollastonite, as above referred to, although the gypsum content thereof must calcine to approxmiately the same extent when subjected to fire as does the gypsum content of boards not having such content of wollastonite and mineral wool fibers, does not shrink and crack so as to allow impinging flame to quickly penetrate through the board, whereby the board incorporating the wollastonite and mineral wool fibers will hold up for a sufficient length of time that it passes the standard fire resistant test procedure.

The invention hereof having been set out and explained in detail, I claim:

1. A composition comprising an intimate admixture of gypsum stucco and mineral wool fibers, the mineral wool fibers being by weight from about one-half to five percent based on the weight of gypsum stucco and the mineral wool fibers substantially entirely individualized and substantially uniformly distributed throughout the mass of gypsum stucco.

2. A product comprising gypsum stucco in combination with by weight of from about one-half to five percent mineral wool fibers and about ten percent finely divided wollastonite, the mineral wool fibers substantially entirely individualized and the fibers and wollastonite substantially uniformly distributed throughout the mass of gypsum stucco.

3. The process of incorporating mineral wool fiber in gypsum stucco substantially as individualized fibers and substantially uniformly distributed throughout a mass of gypsum stucco and comprising the steps of tearing clumps of the mineral wool fiber from a loosely felted mat thereof, advancing a stream of gypsum stucco at a substantially uniform rate, introducing such clumps of mineral wool fiber substantially uniformly to the such advancing stream of gypsum stucco, causing the gypsum stucco to permeate the clumps of mineral wool fiber by initial agitation of gypsum stucco and mineral wool fiber clumps to permeate the mineral wool fiber clumps with the gypsum stucco and then mixing the mixture of gypsum stucco and permeated mineral wool clumps and substantially entirely individualizing the mineral wool fiber and distributing such substantially uniformly throughout the gypsum stucco.

4. The process of incorporating mineral wool in gypsum stucco and comprising the steps of providing a loosely aggregated mineral wool felt and a substantially uniformly advancing stream of gypsum stucco, detaching loosely aggregated clumps of the mineral wool fiber from the mineral wool felt at a substantially uniform rate, feeding such detached clumps at a substantially uniform rate and in the amount of about one-half to five percent by weight to the substantially uniformly advancing gypsum stucco stream, agitating the combined streams causing the gypsum stucco to substantially permeate the mineral wool fiber clumps and finally subjecting the admixture of gypsum stucco and gypsum stucco permeated mineral fiber clumps to further agitation and mixing substantially entirely individualize the mineral wool fibers and distributing the individualizing fibers substantially uniformly throughout the gypsum stucco.

5. The process of incorporating in a substantially uniform admixture, gypsum stucco, finely divided wollastonite and substantially individualized mineral wool fiber and comprising the steps of providing a substantially uniform gypsum stucco stream, providing a loosely aggregated mineral wool felt, severing clumps of loosely aggregated mineral wool fiber from such mineral wool felt, supplying such to the gypsum stucco stream proportionately to the extent of between about one-half to five percent by weight, feeding to the gypsum stucco stream a substantially uniform stream of finely divided wollastonite to the extent of about 5% to 15% by weight and agitating the combined streams and permeating the powdery ingredients thereof into the mineral wool fiber clumps and substantially individualizing the fibers thereof by the interposed powdery particles, and finally additionally agitating the composition and substantially entirely and uniformly distributing the mineral wool fiber throughout the admixed gypsum stucco and wollastonite admixture.

6. A wallboard comprising spaced paper facing sheets and a core therebetween, the core comprising set gypsum and mineral wool fiber substantially individualized and substantially uniformly distributed therethrough in the amount of from about one-half to five percent by weight based on the weight of the set gypsum.

7. A wallboard comprising spaced paper facing sheets and a core therebetween, the core comprising a substantially uniform admixture of set gypsum, mineral wool fiber and finely divided wollastonite, the mineral wool fiber being substantially individualized and present in the amount of between about one-half to five percent of the weight of the set gypsum and the finely divided wollastonite present in the amount of about 5% to 15% by weight of the set gypsum.

8. A wall board comprising spaced paper facing sheets and a core therebetween, the core comprising a substantially uniform admixture of set gypsum, mineral wool fiber and finely divided wollastonite, the mineral wool fiber being substantially individualized and present in the amount of between about one-half to five percent of the weight of the set gypsum and the finely divided wollastonite of a gradation in the approximate range of between about 20 and 200 mesh and screening substantially in the proportions of forty-one percent retained on 30 mesh, thirty-five percent on 50 mesh, and seventy percent on 100 mesh and present in the amount of approximately ten percent by weight of the gypsum content.

9. The method of distributing individualized mineral wool fiber with substantial uniformity throughout a dry powdery mass and comprising the steps of adding loosely felted tufts of loosely felted mineral wool to the powdery material, permeating the tufts with the powdery material by lightly agitating the powdery material and tufts together and separating the fibers of the tufts and distributing the individualized fibers substantially entirely and uniformly in the powdery material by a mixing-stirring operation.

10. The method of forming a fire resistant molded product and comprising the steps of bringing together a powdery hydraulic setting cementitious product and loosely felted tufts of mineral fiber, permeating the tufts with the powdery material by light agitation, incorporating therein finely divided wollastonite and water with mixing, and finally forming the product thereof.

11. The method of forming a fire resistant molded product and comprising the steps of bringing together a powdery hydraulic setting cementitious product and loosely felted tufts of mineral fiber to the extent of approximately one-half to five percent by weight, permeating the tufts with the powdery material by light agitation, incorporating therein finely divided wollastonite to the extent of approximately ten percent by weight, and water, with mixing and of forming the product thereof.

12. The procss of incorporating mineral wool fiber in calcined gypsum as substantially individualized fibers substantially uniformly distributed in the mass and comprising the steps of bringing together ground gypsum rock and small clumps of loosely felted mineral wool fibers in substantially uniform admixture whereby the mineral wool clumps are substantially permeated with the ground gypsum, charging such admixture into a calciner, calcining the mixture while agitating and mixing the mixture and thereby individualizing the mineral wool fiber while distributing the mineral wool fiber substantially uniformly throughout the resulting calcined gypsum.

13. The process of incorporating mineral wool fiber, substantially pulverized wollastonite and calcined gypsum as a substantially uniform admixture of calcined gypsum and wollastonite with the mineral wool fiber substantially uniformly distributed throughout the mass and comprising the steps of bringing together ground gypsum rock, substantially pulverized wollastonite and small clumps of loosely felted mineral wool fibers in substantially uniform admixture whereby the mineral wool clumps are substantially permeated with the mixture of ground gypsum and substantially pulverized wollastonite, charging such admixture into a calciner, calcining the mixture while agitating and mixing the mixture and thereby individualizing the mineral wool fibers while distributing the mineral wool fibers substantially throughout the resulting admixture of calcined gypsum and substantially pulverized wollastonite.

References Cited in the file of this patent

UNITED STATES PATENTS

| | | |
|---|---|---|
| 1,576,141 | Schumacher | Mar. 9, 1926 |
| 1,920,358 | Clark | Aug. 1, 1933 |
| 1,967,959 | McAnally | July 24, 1934 |
| 1,983,532 | Brand | Dec. 11, 1934 |
| 2,031,585 | Best et al. | Feb. 25, 1936 |
| 2,526,066 | Croce | Oct. 17, 1950 |
| 2,681,863 | Croce et al. | June 22, 1954 |
| 2,687,967 | Yedlick et al. | Aug. 31, 1954 |
| 2,787,345 | Soubier et al. | Apr. 2, 1957 |

FOREIGN PATENTS

| | | |
|---|---|---|
| 6,804 | Great Britain | May 20, 1886 |
| 587,556 | Great Britain | Apr. 29, 1947 |